United States Patent
Nainar et al.

(10) Patent No.: US 12,494,991 B2
(45) Date of Patent: Dec. 9, 2025

(54) TRAFFIC PROTECTION WITH PREDETERMINED REROUTE AND ADAPTIVE FAILURE DETECTION FOR USE OF APPLICATIONS HOSTED ON VIRTUAL PRIVATE CLOUDS

(71) Applicant: Cisco Technology, Inc., San Jose, CA (US)

(72) Inventors: Nagendra Kumar Nainar, Morrisville, NC (US); Jaganbabu Rajamanickam, Kanata (CA); Madhan Sankaranarayanan, Chinnamanur (IN); Carlos M. Pignataro, Cary, NC (US); Akram Sheriff, Newark, CA (US)

(73) Assignee: Cisco Technology, Inc., San Jose, CA (US)

( * ) Notice: Subject to any disclaimer, the term of this patent is extended or adjusted under 35 U.S.C. 154(b) by 38 days.

(21) Appl. No.: 18/369,076

(22) Filed: Sep. 15, 2023

(65) Prior Publication Data
US 2025/0097142 A1    Mar. 20, 2025

(51) Int. Cl.
*H04L 45/00*    (2022.01)
*H04L 43/0823*    (2022.01)

(52) U.S. Cl.
CPC .......... *H04L 45/22* (2013.01); *H04L 43/0823* (2013.01)

(58) Field of Classification Search
CPC . H04L 45/22; H04L 43/0823; H04L 65/1073; H04L 43/08; H04L 43/0811; H04L 43/106; H04L 43/20; H04L 43/16
See application file for complete search history.

(56) References Cited

U.S. PATENT DOCUMENTS 8,165,032 B1    4/2012 Hanif et al.
11,729,058 B1 *    8/2023 Agarwal ................. H04L 41/22
                                                709/223

(Continued)

FOREIGN PATENT DOCUMENTS

CN    104202196 A  * 12/2014
WO    WO2021147014      7/2021

OTHER PUBLICATIONS

M. Bhor and D. Karia, "Network recovery using IP fast rerouting for multi link failures," 2017 International Conference on Intelligent Computing and Control (I2C2), Coimbatore, India, 2017, pp. 1-5. (Year: 2017).*

(Continued)

*Primary Examiner* — Messeret F Gebre
(74) *Attorney, Agent, or Firm* — Lee & Hayes, P.C.

(57) ABSTRACT

Techniques are described for quickly rerouting traffic to an application hosted on a first Virtual Private Cloud (VPC) location. In the event of an error in routing traffic to the first VPC portion traffic can be rerouted to a second VPC portion. The first and second VPC portions can be different portions of the same VPC or could be different VPSs. The techniques include steps for calculating a predetermined route to the second private virtual cloud location. The techniques further include steps for monitoring data for detecting an error in the first cloud location. The steps further include detecting a potential error based on the monitored data, and also verifying that the potential error is in fact a valid error. In response to verifying that the error is a valid error, further steps include performing a fast reroute of traffic to the second cloud locations along the predetermined route.

20 Claims, 12 Drawing Sheets

(56) References Cited

U.S. PATENT DOCUMENTS

| | | | | |
|---|---|---|---|---|
| 11,966,306 | B1* | 4/2024 | McGarry | G06F 11/3006 |
| 2011/0041002 | A1* | 2/2011 | Saavedra | H04L 41/5025 |
| | | | | 714/E11.073 |
| 2013/0343174 | A1 | 12/2013 | Guichard et al. | |
| 2014/0198794 | A1* | 7/2014 | Mehta | H04L 69/16 |
| | | | | 370/392 |
| 2018/0183704 | A1 | 6/2018 | Cevher | |
| 2021/0011825 | A1* | 1/2021 | Aggarwal | H04L 12/2854 |
| 2021/0385155 | A1 | 12/2021 | Suryanarayana et al. | |

OTHER PUBLICATIONS

A. Kamisiński, "Evolution of IP Fast-Reroute Strategies," 2018 10th International Workshop on Resilient Networks Design and Modeling (RNDM), Longyearbyen, Norway, 2018, pp. 1-6. (Year: 2018).*

* cited by examiner

TRAFFIC PROTECTION WITH PREDETERMINED REROUTE AND ADAPTIVE FAILURE DETECTION FOR USE OF APPLICATIONS HOSTED ON VIRTUAL PRIVATE CLOUDS

TECHNICAL FIELD

The present disclosure relates generally to data traffic flow protection and more particularly to protection of traffic when using an application hosted on a Virtual Private Cloud (VPC) by predetermined reroute and adaptive error detection.

BACKGROUND

A Virtual Private Cloud (VPC) is a secure, isolated private cloud within a public cloud. VPC customers can run code, store data, host websites, and do anything else they could do in an ordinary private cloud, but the private cloud is hosted remotely by a public cloud provider. VPCs combine the scalability and convenience of public cloud computing with the data isolation of private cloud computing. A public cloud is crowded with various cloud customers accessing computing resources, but a VPC reserves some of those resources for use by only one customer.

A public cloud is a shared cloud infrastructure. Multiple customers of the cloud vendor access that same infrastructure, although their data is not shared. The term for multiple separate customers accessing the same cloud infrastructure is "multitenancy". A private cloud, however, is single tenant. A private cloud is a cloud service that is exclusively offered to one organization. A Virtual Private Cloud (VPC) is a private cloud within a public cloud. No one else shares the VPC with the VPC customer.

A VPC isolates computing resources from the other computing resources available in the public cloud. The key technologies for isolating a VPC from the rest of the public cloud are subnets, Virtual Local Area Network (VLAN), and Virtual Private Network (VPN). A subnet is a range of IP addresses within a network that are reserved so that they are not available to everyone within the network, essentially dividing part of the network for private use. In a VPC these are private IP addresses that are not accessible via the public Internet, unlike typical IP addresses, which are publicly visible.

A LAN is a local area network, or group of computing devices that are all connected to each other without the use of the Internet. A VLAN is a virtual LAN. Like a subnet, a VLAN is a way of partitioning a network, but the partitioning takes place at a different layer within the OSI model (layer 2 instead of layer 3).

A VPN uses encryption to create a private network over the of a public network. VPN traffic passes through publicly shared Internet infrastructure such as routers, switches, etc. However, the traffic is scrambled and not visible to anyone other than the intended customer.

A VPC will have a dedicated subnet and VLAN that are only accessible by the VPC customer. This prevents anyone else within the public cloud from accessing computing resources within the VPC. The VPC customer connects via VPN to their VPC, so that data passing into and out of the VPC is not visible to other public cloud users.

Advantages of using a VPC include scalability, easy hybrid cloud deployment, improved performance, and increased security. Because the VPC is hosted by a public cloud provider, customers can add more computing resources on demand. It is relatively simple to connect a VPC to a public cloud or to on-premises infrastructure via the VPN. Cloud-hosted websites and applications typically perform better than those hosted on local on-premises servers. The public cloud providers that offer VPCs often have more resources for updating and maintaining their infrastructure, especially for small and mid-market businesses. For large enterprises or any companies that face extremely tight data security regulations, this is less of an advantage.

Network reliability and high availability are important factors in a cloud infrastructure deployment. When a link or node fails, then there is a period of traffic disruption until the network reconverges into the new path/topology. Fast failure detection techniques such as Bidirectional Forwarding Detection (BFD) and Seamless Bidirectional Forwarding Detection (SBFD) can be used to detect network link or node failures. Other traffic protection mechanisms such as Internet Protocol Fast Rerouting (IPFRR), Loop-Free Alternate Fast Reroute (LFA-FRR), or Topology Independent Fast Reroute (TI-FRR) can be used to protect business critical traffic. Combinations of the above methods can be used to improve the overall availability.

However, running BFD or SBFD may not be a scalable solution for all of prefixes and scenarios. It is common to see a business application hosted as primary and backup instances in different cloud services for redundancy or load balancing purposes. A branch site may have one or more border nodes connecting to different clouds. App instances can be hosted on different regions of the same cloud or in different clouds with the same IP address while the overlay connectivity is different. When the instance or the connectivity toward one cloud is affected, it normally waits for the regular convergence (failure detection, propagation, and recalculation) which may take a long time to converge.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
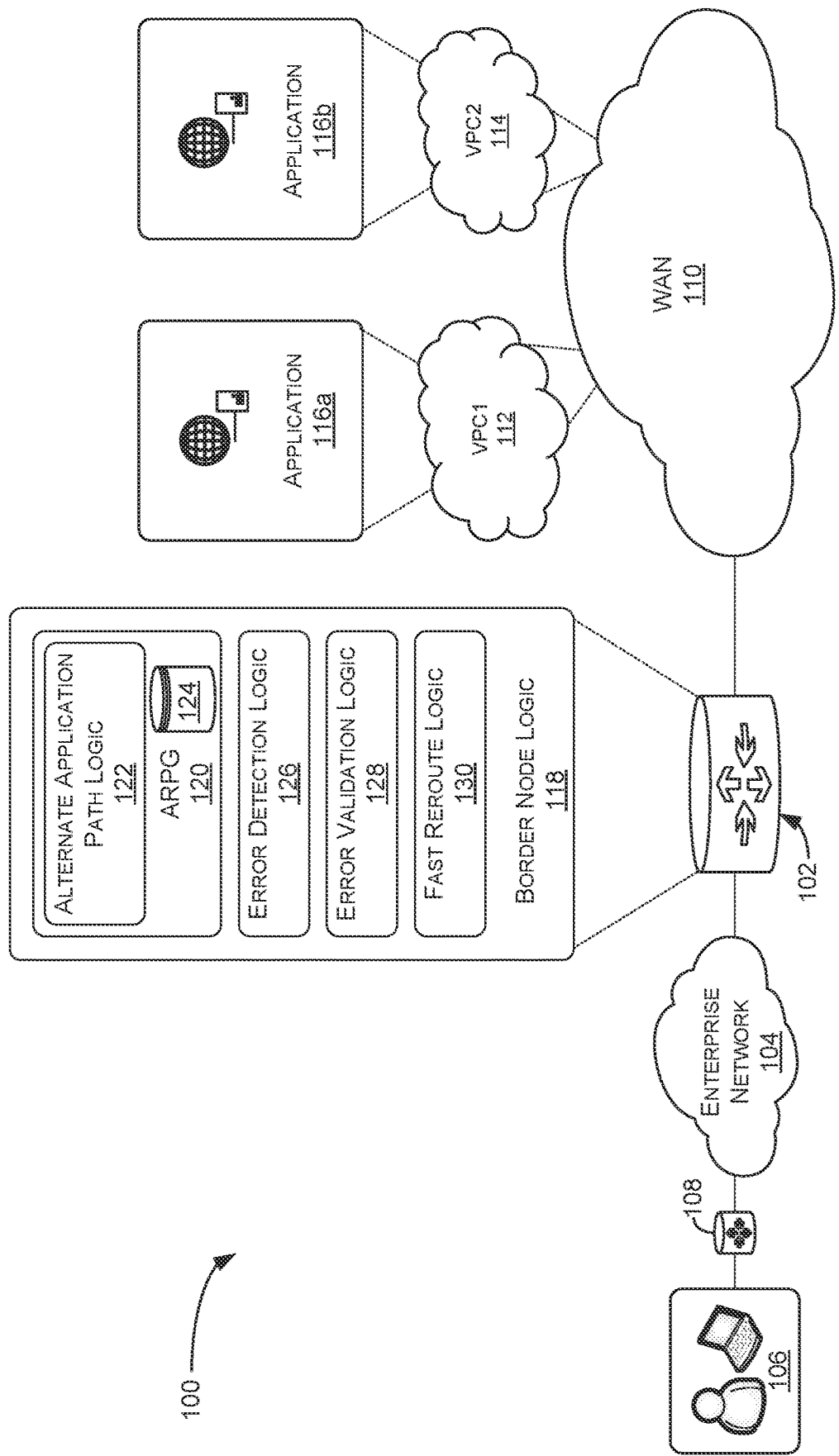
FIG. 1A-1C illustrate a computer network architecture implementing techniques for monitoring network errors and performing fast rerouting of data to an application hosted on a Virtual Private Cloud (VPC).

Embodiments described herein provide proactive techniques for quickly rerouting traffic to an application hosted on a first Virtual Private Cloud (VPC) location. In the event of an error in routing traffic to the first VPC portion traffic can be rerouted to a second VPC portion. The first and second VPC portions can be different portions of the same VPC or could be different VPSs. The techniques include steps for calculating a predetermined route to the second private virtual cloud location. The techniques further include steps for monitoring data for detecting an error in the first cloud location. The steps further include detecting a potential error based on the monitored data, and also verifying that the potential error is in fact a valid error. In response to verifying that the error is, in fact, a valid error, further steps include performing a fast reroute of traffic to the second cloud locations along the predetermined route.

Additionally, the techniques described herein may be performed by a system and/or device having non-transitory computer-readable media storing computer-executable instructions that, when executed by one or more processors, performs the method described above.

EXAMPLE EMBODIMENTS

A virtual private cloud (VPC) is an on-demand, configurable pool of shared resources allocated within a public cloud environment, providing a certain level of isolation between the different organizations (denoted as users) using the resources. The isolation between one VPC user and all other users of the same cloud (other VPC users as well as other public cloud users) is achieved normally through allocation of a private Internet Protocol (IP subnet and a virtual communication construct (such as a Virtual Local Area Network (VLAN) or a set of encrypted communication channels) per user. In a VPC, the previously described mechanism, providing isolation within the cloud, is accompanied with a virtual private network (VPN) function (again, allocated per VPC user) that secures, by means of authentication and encryption, the remote access of the organization to its VPC resources. With the introduction of the described isolation levels, an organization using this service is in effect working on a "virtually private" cloud (that is, as if the cloud infrastructure is not shared with other users), and hence the name VPC. VPC is most commonly used in the context of cloud infrastructure as a service. In this context, the infrastructure provider, providing the underlying public cloud infrastructure, and the provider realizing the VPC service over this infrastructure, may be different vendors.

A web application (hereinafter referred to as an "application") is an application program that is stored on a remote server and delivered over a Wide Area Network (WAN) such as the Internet through a browser interface. Web services are web applications by definition, and many websites contain applications.

Developers design web applications for a wide variety of uses and users, from an organization to an individual for numerous reasons. Commonly used applications can include webmail, online calculators or e-commerce shops. While users can only access some web apps by a specific browser, most are available no matter the browser.

Such Applications can be hosted on a Virtual Private Cloud (VPC), which makes the Web Applications reliant on the health of the VPC on which they are hosted. While an application can be hosted on more than one VPC, a user that is relying on a web application that is hosted on a VPC can run into trouble if the VPC hosting the application goes down or becomes unreachable for some reason. While a user can, in some instances, access the application on a different VPC once the failure of the primary VPC is detected, this can take some time, which may not be acceptable for mission critical applications. It takes time to first detect that the primary VPC has failed. It then take further time to identify an alternate VPC from which the application can be accessed and then further time to calculate a route to that alternate VPC. Techniques described herein allow a user to nearly instantaneously reroute traffic to an application on an alternate VPC in the event that a primary VPC fails or becomes unreachable. This can be accomplished by (1) predetermining that an alternate VPC can host the application in the event that the primary VPC fails, (2) predetermining and calculating a path to the alternate VPC, and (3) continuously monitoring for possible errors of the primary VPC or the path to the primary VPC. Once a failure has been detected and validated, a Fast Reroute (FRR) can quickly and efficiently reroute traffic to the previously determined alternate VPC.

FIGS. 1A-IC are schematic illustrations of computer network architectures according to various embodiments. With reference to FIG. 1A, a computer network architecture 100 includes a border node 102. In some embodiments, the border node 102 can be a router, virtual router, or other network switching device. In one embodiment, the border node 102 can be connected with a local area network (LAN) or Enterprise Network 104. The Enterprise Network 104 can be connected with one or more user devices (user 106) via a border node 108, which can include one or more network switches, routers, or network gateways.

In addition to being connected with the Enterprise Network 104, the border node 102 can also be connected with a Wide Area Network (WAN 110), such as the Internet. In this way, the border node 102 can connect the user 106 with the WAN 110. The WAN 110 can host multiple Virtual Private Clouds (VPCs), which can be physically reside on various computing resources such as servers, network routers or other network switching devices, load balancers, etc., which can reside within or be connected with the WAN 110. As shown in FIG. 1A, first and second VPCs, VPC1 112 and VPC2 114 reside within or are connected with the WAN 110.

The VPCs (VPC1 112, and VPC2 114) can host an Application. For example, VPC1 112 can host an Application 116a, and VPC2 114 can host an Application 116b. The Application 116a, and Application 116b can actually be the same web application that can be hosted on multiple possible VPCs. In this way, the user 106 can access an Application (e.g., Application 116a) via the border node 102, and the WAN 110 by accessing a hosting VPC (e.g., VPC1 112).

As mentioned above, the Applications (Application 116a and Application 116b) are actually the same Application hosted in different VPCs (VPC1 112, VPC2 114). In practice, one VPC can be a primary VPC (e.g., VPC1 112) while the other VPC (e.g., VPC2 114) can be a back-up or alternate VPC. If the primary VPC (VPC1 112) experiences an error and goes down, traffic can be rerouted to the alternate VPC (VPC2 114).

The border node 102 includes Border Node Logic 118 that is configured to quickly and efficiently reroute traffic to the Application 116 from one VPC to another in the case that an error occurs in routing to the first VPC. For example, the Border Node Logic 118 can reroute traffic from VPC1 112 to VPC2 114 in the case that traffic to VPC1 112 becomes compromised such as by a failed node through the WAN 110 on the path to the first VPC (VPC1 112).

The Border Node Logic 118 includes logic and or circuitry for providing an Application Repair Path Gateway (ARPG 120). The ARPG further includes Alternate Application Path Logic 122. The Alternate Application Path Logic 122 includes logic for pre-calculating an alternate path for accessing the Application 116a in the case that the VPC1 on which it is hosted becomes compromised or goes down. For example, assuming that the Application 116a is being hosted on the VPC1 112, the Alternate Application Path Logic determines that the Application (e.g., Application 116b) can also be hosted on VPC2 114. The Alternate Application Path Logic 122 can also calculate a path to that VPC2 114 in advance to have that path calculation ready for fast rerouting in the case of a failure of VPC1 112.

Figure 1B:
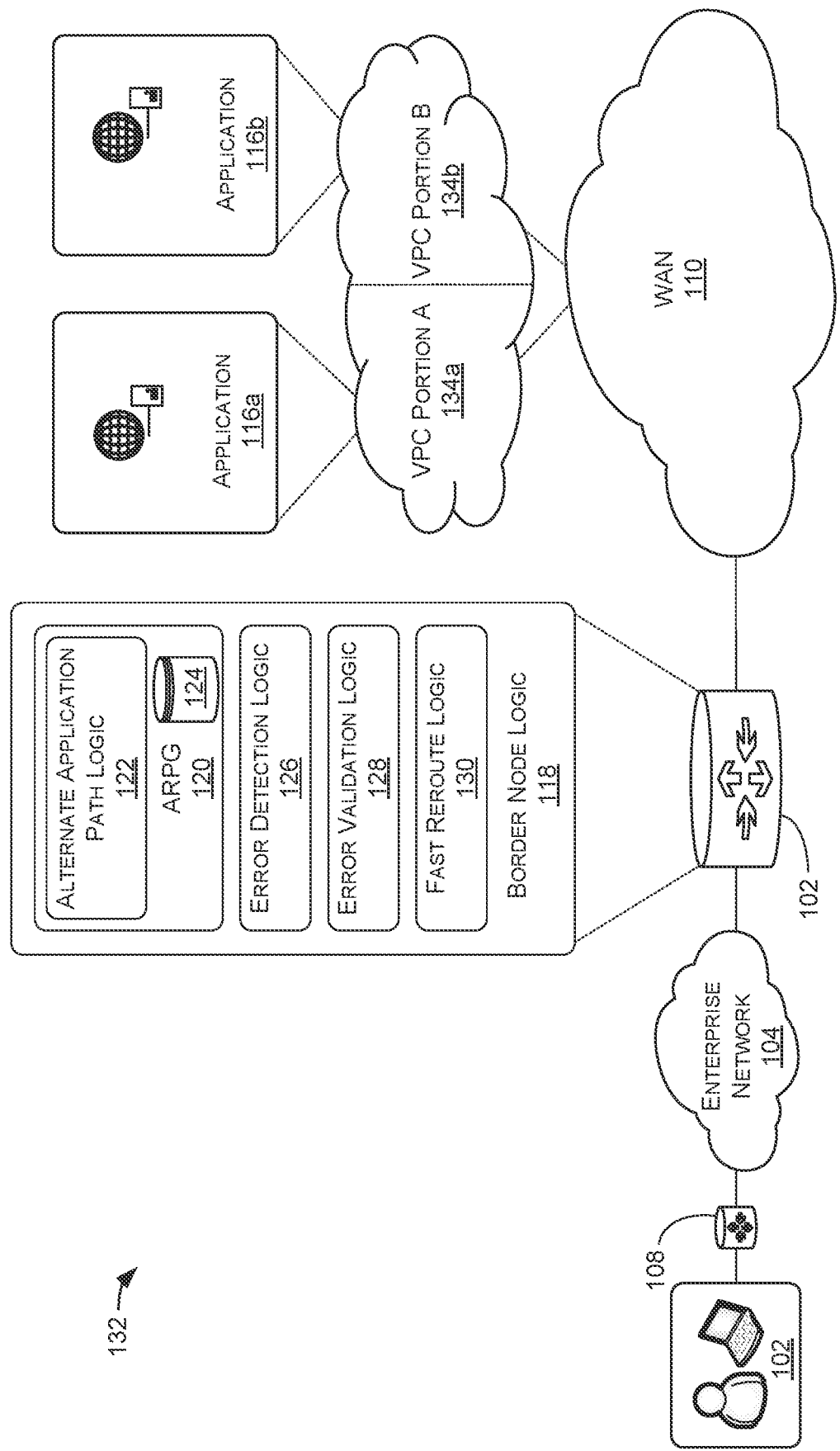
Figure 1C:
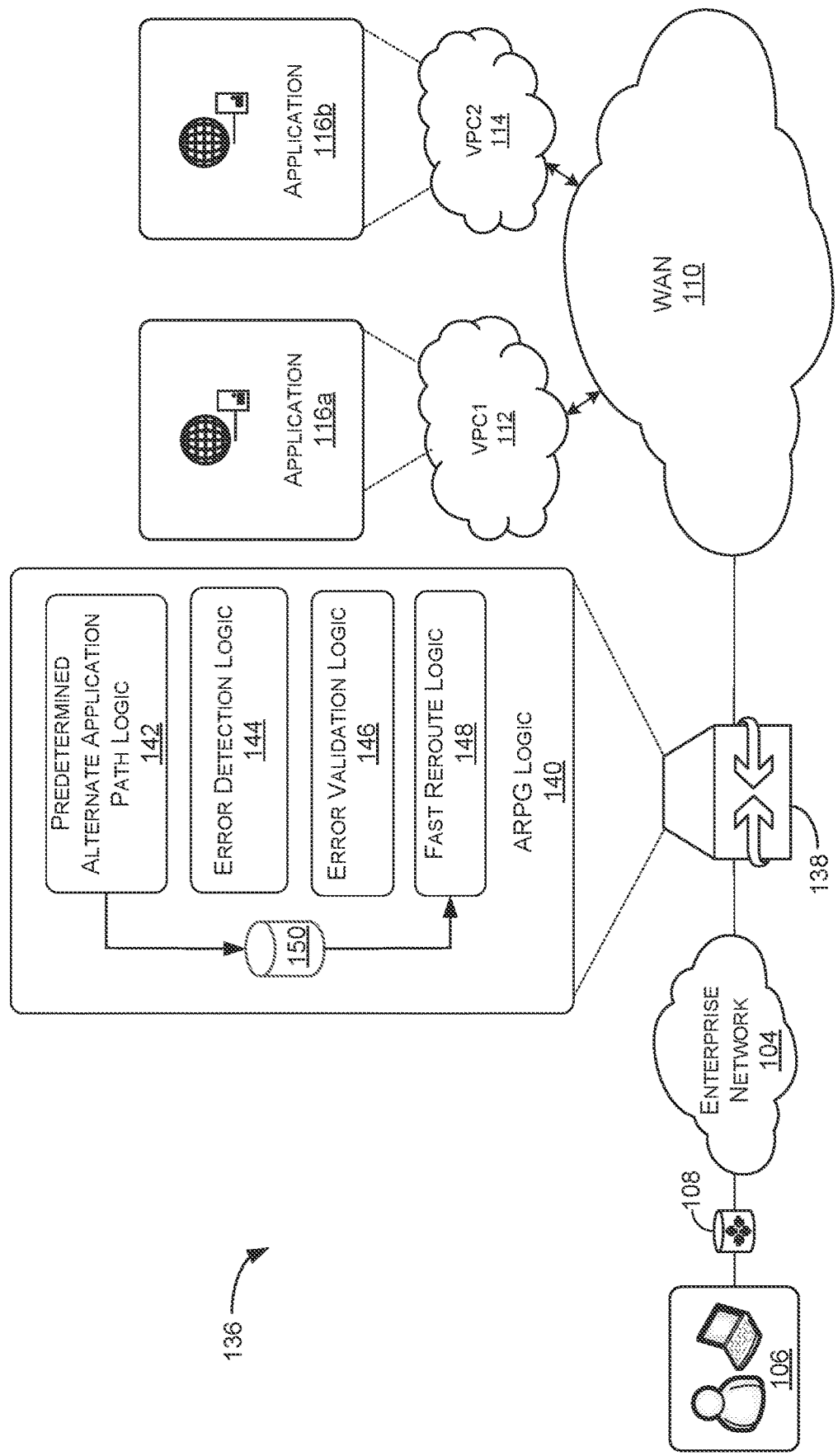

The ARPG 120 will have this information about the Application 116 and its corresponding available VPCs (e.g., VPC1 112, VPC2 114) on which the Application 116 can be hosted. While only two possible VPCs are shown in FIGS. 1A-1C, this is by way of example. There may be any number of possible available VPCs for hosting the Application 116. When the Border Node Logic 118 detects a failure of the Application 116a and/or the hosting VPC1 112, then the border node can fast reroute the traffic to the ARPG with the respective underlay encapsulation. This encapsulation contains the information about the Application and VPC that failed and allows the ARPG 120 to choose the respective alternate VPC location (e.g., VPC2 114) on which the Application 116b can be hosted. In one embodiment, the ARPG 120 can include a database 124 on which the data regarding the alternate VPC and alternate path can be stored for quick retrieval. The database 124 can include computer memory such as magnetic memory, solid state memory, Application Specific Integrated Circuitry (ASIC) memory, CPU memory, etc.

In order to detect such an error and quickly reroute traffic to an alternate VPC, the Border Node Logic 118 can also include Error Detection Logic 126, Error Validation Logic 128, and Fast Reroute Logic 130. The Error Detection Logic 126 can receive and analyze data from the WAN regarding the VPC1 112 and from the VPC1 112 itself. As mentioned above, the VPC1 112 can actually reside in the WAN, and therefore can employ various devices residing within the WAN, such as computer servers, routers, switches, load balancers, etc. Failure of any of these devices on the path to the VPC1 112 or within the VPC1 112 can result in a failure of the VPC wan that can be detected in one or more of various ways.

One way that the Error Detection Logic 126 can detect an error is by collecting and analyzing Transmission Control Protocol (TCP) and acknowledgement (ACK) statistics gathered from the WAN 110. The Error Detection Logic 126 collects the TCP statistics for the Application 116a and for the VPC1 112 based on the VPC FRR provisioning. When there is an update in the To-application "To-App1" statistics, the platform will check the last updated time difference between To-application "To-App1" and From-Application1 "From-App1". If the "From-App1" last update is less than the provisioned threshold (e.g., less than 1 second) compared with the "To-App" last update, then the Error Detection Logic can determine that there is an error of failure somewhere within the route to the VPC1 112 or within the VPC1 112. This method for error detection can be beneficial for detecting an error using a data-plane based approach.

Another technique for detecting possible errors uses a control plane approach. Using this method, the Error Detection Logic 126 snoops Internet Control Message Protocol (ICMP) for errors such as unreachable or port not found messages to detect the failure of App1 116a or failure of the application App1 116a. The ICMP errors could be generated by bad nodes or devices along the path to the App1 116a, such as along a path through the WAN 110.

If the Error Detection Logic 126 detects a possible error, such as by the techniques described above, then the Error Validation Logic 128 can perform techniques to validate whether there is actually a failure or valid error. The Error Validation Logic can use Bidirectional Forwarding Detection (BFD) or Seamless Bidirectional Forwarding Detection (SBFD) to validate whether there is an error. Because the previously described Error Detection Logic can detect a possible error before engaging the Error Validation Logic 128, the BFD or SBFD does not need to be continuously run, which would be impractical in actual implementation. Bidirectional Forwarding Detection (BFD) is a network protocol that is used to detect faults between two routers or switches connected by a link. It provides low-overhead detection of faults even on physical media that doesn't support failure detection of any kind, such as Ethernet, virtual circuits, tunnels and MPLS label-switched paths.

BFD establishes a session between two endpoints over a particular link. If more than one link exists between two systems, multiple BFD sessions may be established to monitor each one of them. The session is established with a three-way handshake and is torn down the same way. Authentication may be enabled on the session.

BFD does not have a discover mechanism. Sessions must be explicitly configured between endpoints. BFD may be used on many different underlying transport mechanisms and layers and operates independently of these. Therefore, it needs to be encapsulated by whatever transport it uses. For example, monitoring MPLS LSPs involves piggybacking session establishment on LSP-Ping packets. Protocols that support some form of adjacency setup, such as OSPF, IS-IS, BGP or RIP may also be used to bootstrap a BFD session. These protocols may then use BFD to receive faster notification of failing links than would normally by possible using the protocol's own keepalive mechanism.

A session may operate in one of two modes: asynchronous mode and demand mode. In asynchronous mode, both endpoints periodically send Hello packets to each other. If a number of those packets are not received, the session is considered to be down. In demand mode, no Hello packets are exchanged after the session is established. It is assumed that the endpoints have another way to verify connectivity to each other, perhaps on the underlying physical layer. However, either host may still send Hello packets if needed. Regardless of which mode is in use, either endpoint may also initiate an Echo function. When this function is active, a stream of Echo packets is sent, and the other endpoint then sends these back to the sender via its forwarding plane. This is used to test the forwarding path on the remote system.

Seamless Bidirectional Forwarding Detection (SBFD) is a simplified mechanism for using BFD with a large proportion of negotiation aspects eliminated, thus providing benefits such as quick provisioning, as well as improved control and flexibility for network nodes initiating path monitoring. SBFD runs in an asymmetric behavior, using initiators and reflectors. The initiator is an SBFD session on a network node that performs a continuity test to a remote entity by sending SBFD packets. The initiator injects the SBFD packets into the segment-routing traffic-engineering (SRTE) policy. The initiator triggers the SBFD session on a network node that listens for incoming SBFD control packets to locate entities and generates response SBFD control packets. The reflector is stateless and only reflects the SBFD packets back to the initiator. A node can be both an initiator and a reflector, thereby allowing configuration of different SBFD sessions.

Once the Error Validation Logic 128 has determined that there is a valid error or failure (such as by implementing the above-described BFD or SBFD) the Fast Reroute Logic 130 can initiate a Fast Reroute (FRR) to reroute traffic to the previously determined alternate VPC (e.g., VPC2 114). Because the Alternate Application Path Logic 122 has already determined the alternate VPC (VPC2 114) as well as a path to the VPC2 114 and has stored this information in the database 124, this information can be quickly retrieved from the database 124. The traffic can, therefore, be very quickly and seamlessly rerouted to the alternate VPC (VPC2 114) so that the Application 116*b* can continue to function essentially without interruption. This, therefore, provides great value to the business or other entity that is relying on the Application 116.

FIG. 1A as described above, shows the VPCs (VPC1 112, VPC2 114) as being completely separate VPCs which may be hosted or reside in the WAN 110. However, it is also possible for the Application 116 to be hosted on different locations of the same VPC. For example, FIG. 1B shows a computer architecture 132, that can be similar to the computer architecture 100 described above with reference to FIG. 1A. However, as shown in FIG. 1B, the Application 116 can be hosted on different portions of the same VPC. As shown in FIG. 1B, the Web Application (Application 116*a*) can be hosted on VPC Portion A 134*a*, and Application 116*b* can be hosted on VPC Portion B 134*b*. As described above with reference to FIG. 1A, Application 116*a* and Application 116*b* are the same application but are labeled with suffixes "a" and "b" merely in order to illustrate that they are hosted on different VPC locations. The VPC Portion A 134*a*, and VPC Portion B 134*b* can be operated by the same VPC provider and may share some common infrastructure. However, they can also each include different specific components, such as different server computers, routers, switches load-balancers, etc.

FIG. 1C is a schematic illustrating a computer network architecture 136 that is similar to those described above with reference to FIGS. 1A and 1C. The computer network architecture 136 includes a border node 138 that is configured as a network gateway. The border node 138 can be a physical gateway device or could be a virtual gateway implemented by software in a computer network. The border node 138 includes Application Repair Path Gateway Logic (ARPG Logic 140). The ARPG Logic 140 includes a Predetermined Alternate Application Path Logic 142, Error Detection Logic 144, Error Validation Logic 146, and Fast Reroute Logic 148. The Predetermined Alternate Application Path Logic 142 calculates a route to an alternate VPC before any error occurs in the primary VPC. For example, if VPC1 112 is the primary VPC for hosting the Application, then the Predetermined Alternate Application Path Logic 142 can pre-determine that VPC2 114 can host the Application 116*b* and can calculate a path to that VPC2 114 and to the Application 116*b*. The Predetermined Alternate Path Logic 142 can then store this information in a database 150. The database can include one or more of various types of computer memory such as, magnetic memory, solid state memory, Application Specific Integrated Circuitry (ASIC), CPU, etc.

The Error Detection Logic 144 collects and analyzes data in order to determine whether a potential error has occurred in the path to the VPC1 112, within the VPC1 112 itself, or within the Application 116. In one embodiment, the Error Detection Logic 144 can collect TCP statistics for the Application 116 and for the VPC1 112 based on the Fast Reroute (FRR) provisioning. When there is an update to the "To-App1" statistics, the Error Detection Logic 144 can check the last updated time difference between To-application "To-App" and From-application "From-App". If the From-App last update is less than the provisioned threshold, (as compared with the To-App last update), then the Error Detection Logic 144 can determine that a potential error has occurred.

According to another technique, the Error Detection Logic 144 can snoop the ICMP error data to detect the failure of the application or the reachability to the application. The ICMP errors could be generated by bad nodes or devices in the path to the Application 116 or by malicious actors in the WAN 110 on the path to the VPC 112.

If the Error Detection Logic 144 determines that a potential error or failure has occurred, The Error Validation Logic 146 can be accessed to verify whether an actual valid error has occurred. The Error Validation Logic 146 can accomplish this through the previously described Bidirectional Forwarding Detection (BFD) or Seamless Bidirectional Forwarding Detection (SBFD).

If the Error Validation Logic 146 determines that an actual error or failure has occurred, the Fast Reroute Logic 148 can be engaged to quickly reroute traffic from the VPC1 112 to the VPC2 114 and to the Application 116*b*. The Fast Reroute Logic 148 can access the database 150 to retrieve the previously stored alternate route data to perform the Fast Reroute (FRR) without having to perform determine where to route the data and without having to calculate the route.

Figure 2:
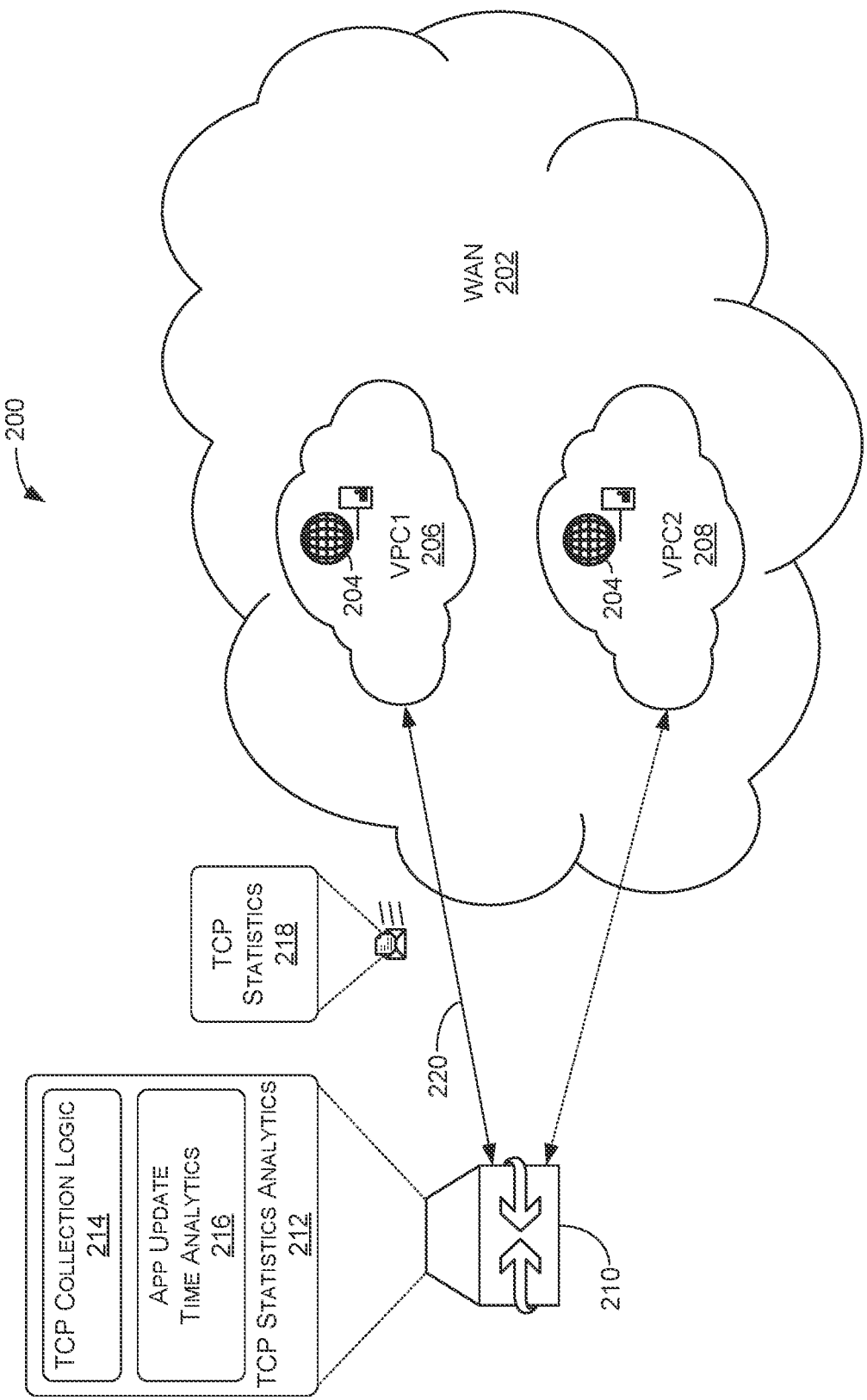
FIG. 2 illustrates a schematic of computer logic and circuitry for performing error detection through collection and analysis of Transmission Control Protocol (TCP) Statistics.

FIG. 2 is a schematic view of a network architecture 200 for monitoring and detecting potential errors in an application hosted on a Virtual Private Cloud (VPC). The network architecture 200 includes a Wide Area Network (WAN) 202 such as the Internet. An Application 204 is hosted on multiple Virtual Private Clouds VPC1 206, and VPC2 208. A border node 210 can access the Application 204 on the VPC1 206 and VPC2 208. In one exemplary embodiment, VPC1 206 can be a primary VPC for hosting the Application 204 and VPC2 208 can be a possible backup VPC for accessing the Application 204.

In one embodiment, the border node 210 is a network gateway. In another embodiment, the border node can be a router or network switch. A gateway connects networks, while a router typically delivers data within a network. Historically, gateways and routers have been separate devices. However, it is become more common for their functions to be combined and simply called a router. For example, Wi-Fi Routers commonly used for home and small business Internet service are both a router (delivering data) and a gateway (translating data so that destination devices can use the data).

A physical network gateway includes network interface cards (NICs) and inputs and outputs (usually Ethernet) and software for translating network protocols. Gateway functions may also be defined, deployed, and controlled through software, and are increasingly being built into routers and other equipment. A gateway is typically used on the network layer of the Open-Source Interconnection (OSI) model, but it could theoretically be deployed on any of the OSI layers. Standalone or virtual gateways may be placed anywhere in a network where translation is needed. They can be unidirectional (allowing data to flow in only one direction) or bidirectional (allowing data to flow both into and out of a network). As an entry or exit point for data, a gateway can be used in a variety of security processes, such as a firewall to scan and filter data or a proxy server to maintain restricted access to certain applications or assets.

The border node 210 includes logic and/or circuitry for monitoring Transmission Control Protocol (TCP) statistics (TCP Statistics Analytics 212). The TCP Statistics Analytics 212 includes TCP Collection Logic 214 and App Update Time Analytics 216. The TCP Collection Logic 214 collects TCP Statistics 218 for the VPC1 206. The TCP Statistics 218 may be received as data packets delivered across the WAN 202.

The App Update Time Analytics 212 analyzes the received TCP Statistics 218 to determine whether there is an error in the VPC1 206 or on the path 220 between the border node 210 to the VPC1 206 within the WAN 202. The App Update Time Analytics 216 analyzes the TCP Statics 218 based on the Fast Reroute (FRR) provisioning. When there is an update to the "To-App1" statistics, the Error Detection Logic 114 can check the last updated time difference between "To-App" and "From-App". If the From-App last update is less than the provisioned threshold, (as compared with the To-App last update), then the App Update Time Analytics 216 can determine that a potential error has occurred. Once a potential error has been detected, a verification can be performed to verify that the error was a valid error.

If the App Update Time Analytics 216 determines that there has been an error in the path 220 between the border node 210 and the VPC1 206 or within the VPC1 206 itself, then the border node 210 can perform a Fast Reroute to reroute traffic to the alternates VPC (VPC2 208) along a predetermined alternate path 222. This can ensure seamless, continued use of the App 204.

Figure 3:
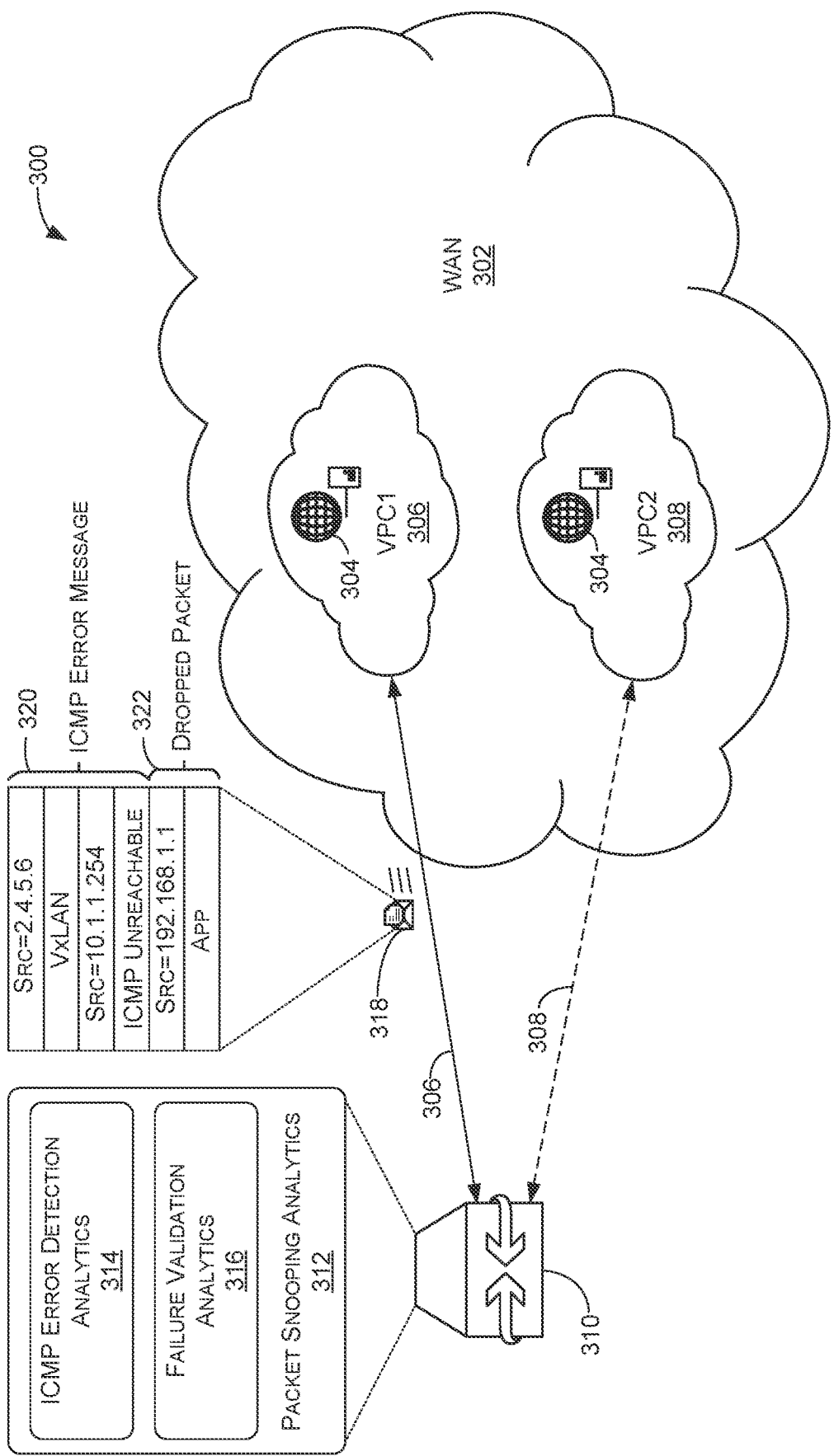
FIG. 3 illustrates a schematic of computer logic and circuitry for performing error detection through collection and analysis of Internet Control Message Protocol (ICMP) data.

FIG. 3 is a schematic view of a network architecture 300 for monitoring and detecting potential errors in an application hosted on a Virtual Private Cloud (VPC). The network architecture 300 includes a Wide Area Network (WAN) 302 such as the Internet. A Application 304 is hosted on multiple Virtual Private Clouds VPC1 306, and VPC2 308. A border node 310 can access the Application 304 on the VPC1 306 and VPC2 308. In one exemplary embodiment, VPC1 306 can be a primary VPC for hosting the Application 304 and VPC2 308 can be a possible backup VPC for accessing the Application 304.

In one embodiment, the border node 310 is a network gateway. In another embodiment, the border node can be a router or network switch. A gateway connects networks, while a router typically delivers data within a network. Historically, gateways and routers have been separate devices. However, it is become more common for their functions to be combined and simply called a router. For example, Wi-Fi Routers commonly used for home and small business Internet service are both a router (delivering data) and a gateway (translating data so destination devices can use the data).

The border node 310 includes Packet Snooping Analytics 312. The Packet Snooping Analytics 312 includes analytics for collecting and analyzing Internet Control Message (ICMP) data (ICMP Error Detection Analytics 314). The Packet Snooping Analytics 312 also includes Failure Validation Analytics 316. The border node 310 can receive ICMP error data from an ICMP data packet 318 which regarding one or more network nodes of a path to the VPC1 306, and which may include ICMP data regarding one or more network devices of the WAN 302 and/or VPC1 306, such as routers, switches, load balancers, servers, etc.

The ICMP error data can be received as one or more data packets having packet headers. The packet headers can have sub-header portions containing ICMP error message data (ICMP Error Message field 320) as well as sub-header portions containing Dropped Packet data (Dropped Packet field 322). The border node 310 can send the ICMP packet 318 to the Application 304 hosted on the VPC1 306 and receive the returned ICMP packet 318 to collect the data in the ICMP Error Message field 320 and the Dropped Packet field 322.

The Internet Control Message Protocol (ICMP) is a supporting protocol in the Internet protocol suite. It is used by network devices, including routers, to send error messages and operational information indicating success or failure when communicating with another IP address, for example, an error is indicated when a requested service is not available or that a host or router could not be reached. ICMP differs from transport protocols such as Transmission Control Protocol (TCP) and User Datagram Protocol (UDP) in that it is not typically used to exchange data between systems, nor is it regularly employed by end-user network applications, with the exception of some diagnostic tools. ICMP for Internet Protocol version 4 (IPv4) is defined in RFC 792. ICMPv6 is defined by RFC 4443 and is used with Internet Protocol version 6 (IPv6).

ICMP is part of the Internet protocol suite as defined in RFC 792. ICMP messages are typically used for diagnostic or control purposes or are generated in response to errors in Internet Protocol (IP) operations. ICMP errors are directed to the source IP address of the originating packet. For example, every device, such as an intermediate router, forwarding an IP datagram first decrements the Time To Live (TTL) field in the IP header by one. If the resulting TTL is 0, the packet is discarded and an ICMP time exceeded in transit message is sent to the datagram's source address.

Many commonly used network utilities are based on ICMP messages. The traceroute command can be implemented by transmitting IP datagrams with specially set IP TTL header fields, such as ICMP Error Message field 320 and Dropped Packet field 322 and looking for ICMP "time exceeded in transit" and "destination unreachable" messages generated in response. The related pin utility is implemented using the ICMP echo request and echo reply messages.

ICMP uses the basic support of IP as if it were a higher-level protocol, however, ICMP is actually an integral part of IP. Although ICMP messages are contained within standard IP packets, ICMP messages are usually processed as a special case, distinguished from normal IP processing. In many cases, it is necessary to inspect the contents of the ICMP message and deliver the appropriate error message to the application responsible for transmitting the IP packet that prompted the ICMP message to be sent (e.g., border node 310).

ICMP is a network-layer protocol, this makes it layer 3 protocol by the 7-layer OSI model. Based on the 4-layer TCP/IP model, ICMP is an internet-layer protocol, which makes it a layer 2 protocol or layer 3 protocol instead of an internet-layer in their TCP/IP model definition.

If data in the ICMP Error Message field 320 and the Dropped Packet field 322 indicate that a potential error has occurred on the path to the Application 304 hosted on the VPC1 306, then the Failure Validation Analytics 316 can be employed to validate the error (i.e., validate whether the potential error is an actual, valid error). The Failure Validation Analytics 316 can use Bidirectional Forwarding Detection (BFD) or Seamless Bidirectional Forwarding Detection (SBFD) to determine whether error is a valid error. The border node 310 can send a BFD or SBFD packet to the Application 304 hosted on the VPC1 306 to perform the BFD or SBFD error validation.

If the error is determined to be a valid error, the border node can perform a Fast Reroute (FRR) to reroute data traffic from a first path 324 (to the VPC1 306) to a second path 326 (to the VPC2 308). As described above with reference to FIGS. 1A-C, the VPC2 308 capable of hosting the Application 304 and the path 308 to the VPC2 308 can be previously calculated to make the FRR of data to the VPC2 308 very quick and efficient.

Fast Reroute (FRR) is a Multiprotocol Label Switching (MPLS) and IP resiliency technology to provide fast traffic recovery upon link or router failures for mission critical services. Upon any single link or node failure, it could be able to recover impacted traffic flows in the level of 50 milliseconds. In the IP domain, Loop-Free Alternates (LFAs) and not-via technology have been used to immediately recover data packets upon the failure of a default next-hop.

Figure 4:
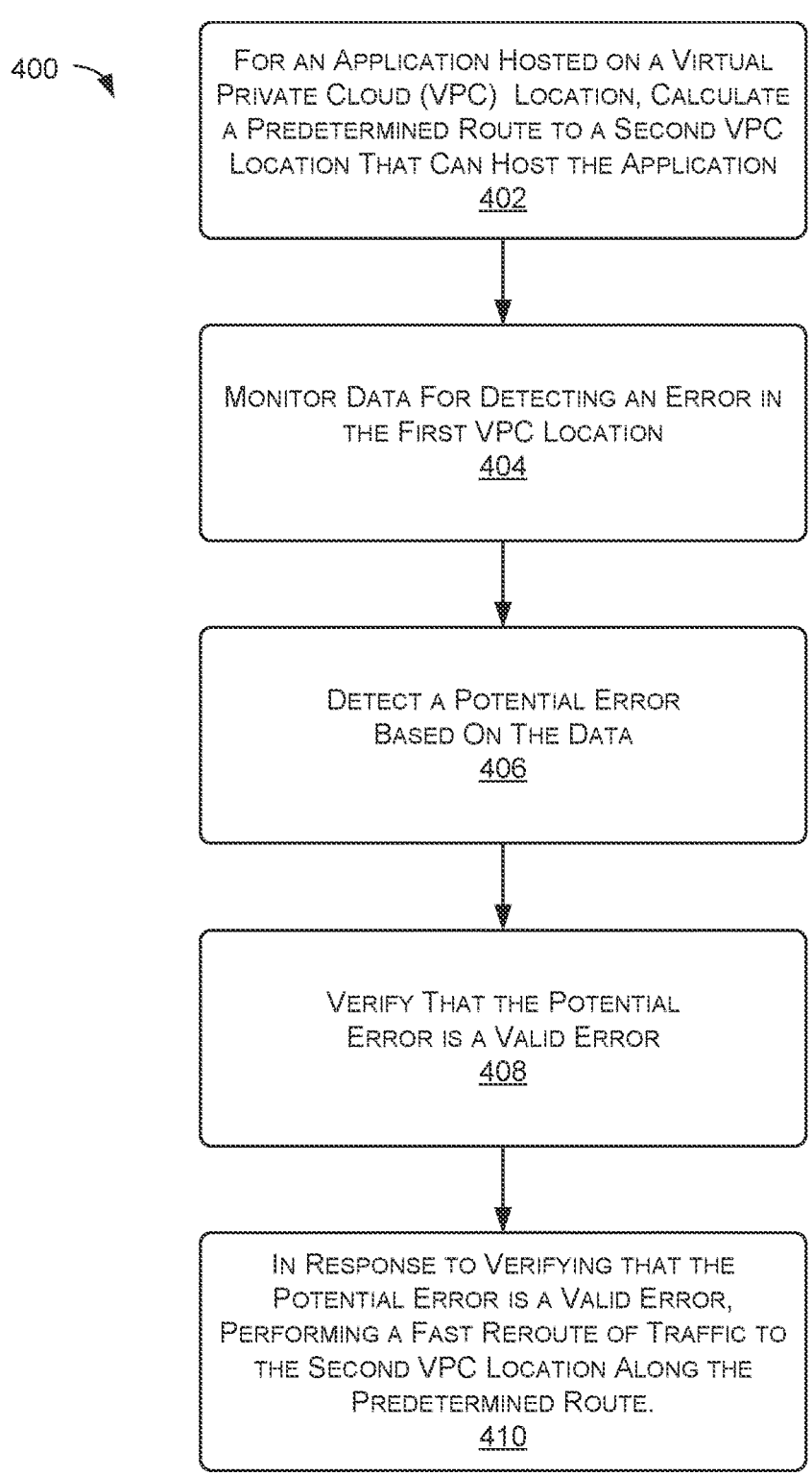
FIG. 4 is a flowchart illustrating a method according to an embodiment for performing fast reroute and error detection with an application hosted on a VPN.

FIG. 4 is a flowchart illustrating a method 400 including techniques for quickly and efficiently rerouting data traffic for a cloud-hosted application from a first VPC to a second VPC on which the application can be hosted in the case that the first VPC can no longer host the application. The method 400 includes operations 402 for calculating a predetermined route to a second VPC location for an Application hosted on a first VPC. Before a failure of the first VPC occurs, a second VPC that can host the Application is determined so that the path to that second VPC can be calculated.

The method 400 further includes monitoring data for detecting an error in the first VPC location 404. This can include monitoring data that can indicate an error in the path to the first VPC location, including errors with regard to devices such as routers, switches, load balancers, servers etc. These devices can be devices on a Wide Area Network (WAN) such as the Internet. The monitoring of data can include collecting and analyzing TCP traffic and TCP ACK statistics. The monitoring or data can also include snooping ICMP Error Packets.

The method 400 further includes operations for detecting a potential error based on the monitored data 406. The error can be an error in a path to the Application hosted on the first VPC and can also be an error in the first VPC itself. In one embodiment, the calculation of the predetermined route to the second VPC location is performed prior to detecting the potential error. The method further includes operations for verifying that the potential error is a valid error 408. This can be performed using Bidirectional Forwarding Detection (BFD) or by performing Seamless Bidirectional Forwarding Detection (SBFD). In response to determining that the potential error is a valid error, the method further includes performing a Fast Reroute (FRR) of traffic to the second VPC location along the previously predetermined and calculated route 410. Because the identification of the second VPC location capable of hosting the Application as well as the route to the second VPC location have been previously determined and calculated, the rerouting of traffic to the second VPC location can be performed very quickly, thereby preventing loss of the Application for a user.

Figure 5:
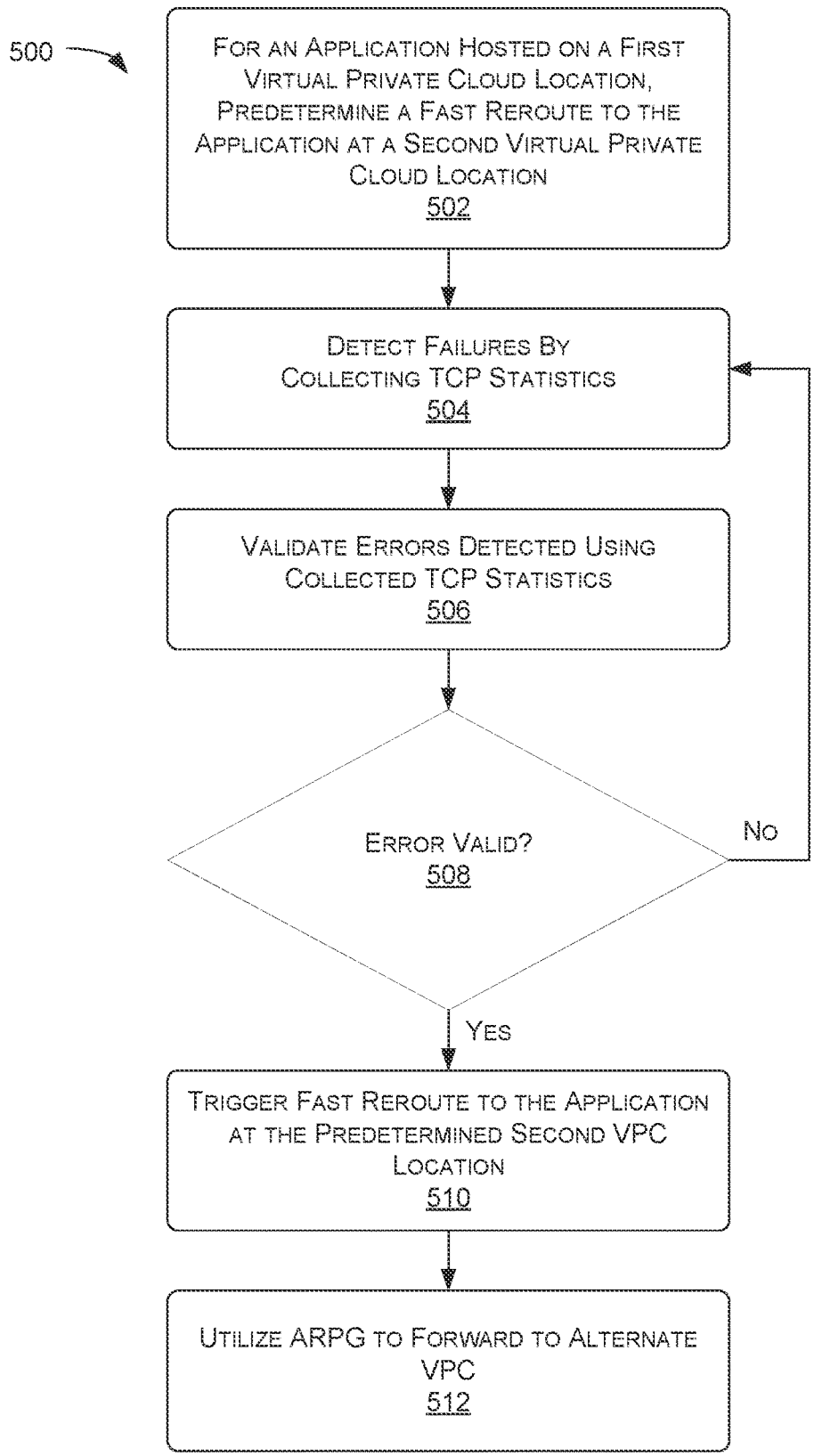
FIG. 5 is a flowchart illustrating a method according to another embodiment for performing fast reroute and error detection with an application hosted on a VPN.

FIG. 5 is a flowchart illustrating a method 500 according to an aspect of the invention. The method 500 includes operations 502 for predetermining a fast reroute for an Application hosted on a first Virtual Private Cloud (VPC) location to a second VPC location that can also host the Application. The first and second VPC locations can be different locations of the same VPC or could be completely different VPCs located within a Wide Area Network (WAN) such as the Internet. The method further includes operations for detecting failures by collecting TCP Statistics for 504 the Application. When there is an update to the "To-App" statistics, the last updated time difference between "To-App" and "From-App" can be checked. If the "From-App" last update is less than a predetermined threshold compared with the "To-App" last update, then it can be determined that there is a possible error or failure.

In an operation 506, errors are validated. The errors can be validated using the collected TCP statistics. The Errors can also be validated using BFD or SBFD. In decision step 508, a determination is made as to whether the potential errors are valid errors. If no (the errors are not valid errors) the method 500 returns to operation 504 to continue detecting failures by continuing to collect TCP statistics. If the answer to decision step 508 is yes. (the error is a valid error) then the method 500 continues to operation 510 to trigger a Fast Reroute (FRR) to the predetermined second VPC location. This FRR can be performed by an Application Repair Path Gateway (ARPG) which has the information regarding the Application and its corresponding VPCs where the Application can be hosted. In an operation 512, the ARPG is utilized to forward traffic to the alternate, second VPC.

Figure 6:
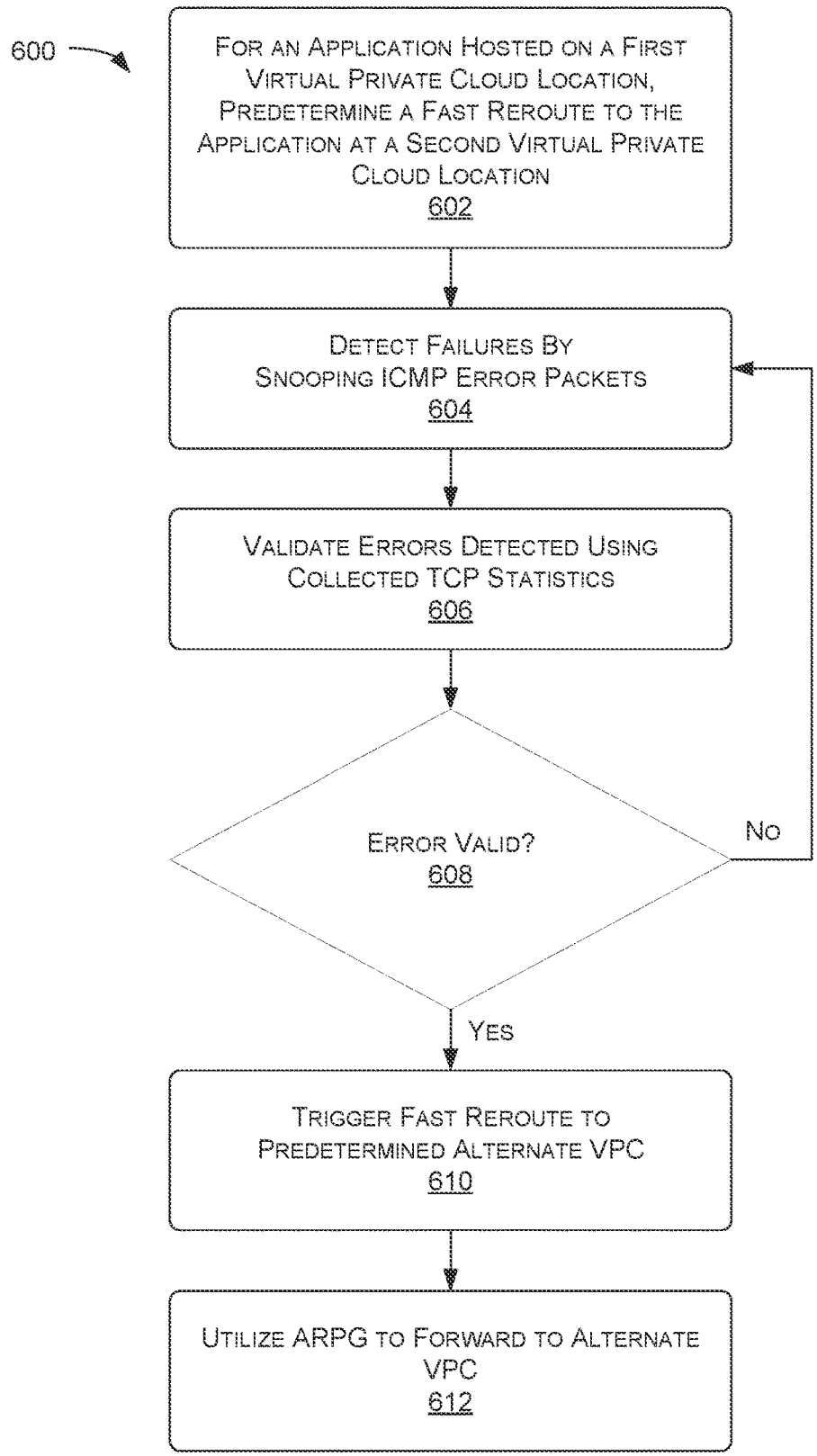
FIG. 6 is a flowchart illustrating a method according to another embodiment for performing fast reroute and error detection with an application hosted on a VPN.

FIG. 6 is a flowchart illustrating a method 600 according to another embodiment. The method 500 includes operations 602 for predetermining a fast reroute for an Application hosted on a first Virtual Private Cloud (VPC) location to a second VPC location that can also host the Application. In an operation 604 Failures are detected by snooping ICMP Error Packets. A border node can snoop the ICMP error, such as unreachable or port not found, to detect the failure of the application or the reachability to the application. The ICMP errors could be generated by bad nodes or devices in a WAN on a path to the Application. Operation 606 includes validating errors detected using the collected TCP statistics. The errors can be validated using Bidirectional Forwarding Detection BFD. Seamless Bidirectional Forwarding Detection (SBFD) or some other error validation technique.

In a decision operation 608, a determination is made as to whether the possible errors are valid errors. The decision can be based on the validation operations 606. If no, the errors are not valid errors, then the method 600 returns to operation 604 to continue snooping ICMP error packets to search for possible errors. If the answer to decision operation 608 is yes, the errors are valid errors, then the method 600 continues to operation 610, which includes triggering a Fast Reroute (FRR) to a route to the previously determined alternate VPC that can host the application. In operation 612, traffic is rerouted to the alternate VPC. The routing of traffic to the alternate VPC can be performed using an Application Repair Path Gateway (ARPG).

Figure 7:
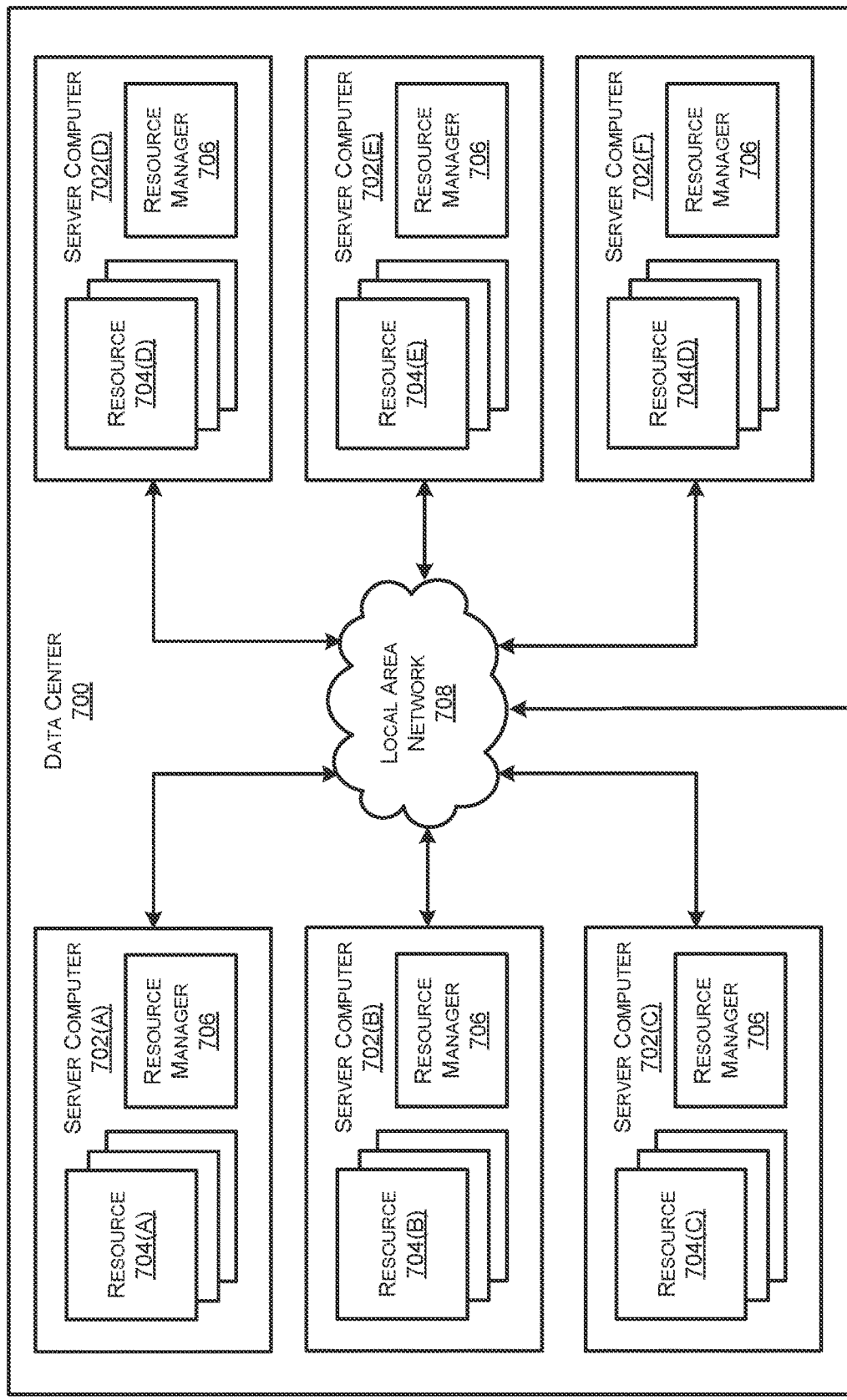
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, the any type of networked device described herein. Although described as servers, the server computers 702 may comprise any type of networked device, such as servers, switches, routers, hubs, bridges, gateways, modems, repeaters, access points, etc.

The server computers 702 can be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, and others. Some of the server computers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate network 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized.

In some examples, the server computers 702 may each execute one or more application containers and/or virtual machines to perform techniques described herein.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
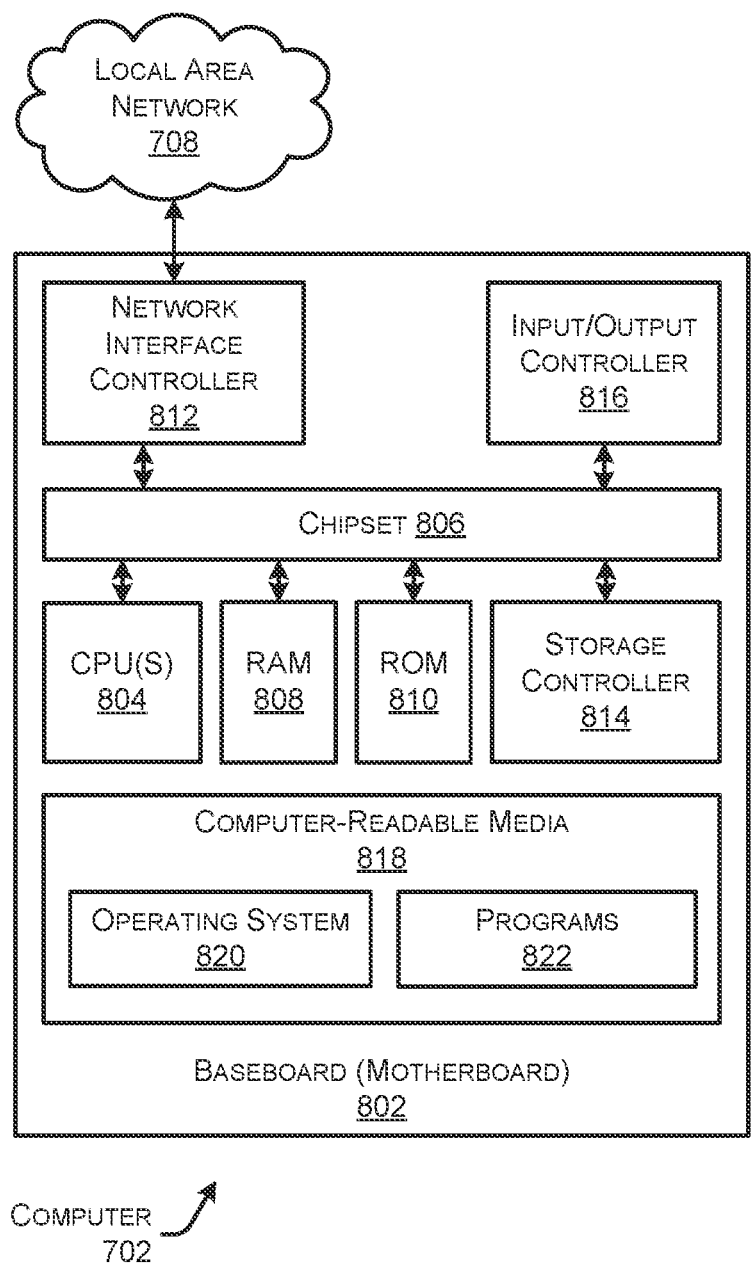
FIG. 8 is a computer architecture diagram showing an illustrative computer hardware architecture for implementing a computing device that can be utilized to implement aspects of the various technologies presented herein.

FIG. 8 shows an example computer architecture for a server computer 702 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The server computer 702 may, in some examples, correspond to a physical server, and may comprise networked devices such as servers, switches, routers, hubs, bridges, gateways, modems, repeaters, access points, etc.

The server computer 702 includes a baseboard 802, or "motherboard," which is a printed circuit board to which a multitude of components or devices can be connected by way of a system bus or other electrical communication paths. In one illustrative configuration, one or more Central Processing Units (CPUs 804) operate in conjunction with a chipset 806. The CPUs 804 can be standard programmable processors that perform arithmetic and logical operations necessary for the operation of the server computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the server computer 702. The chipset 806 can further provide an interface to a computer-readable storage medium such as a read-only memory ("ROM") 810 or non-volatile RAM ("NVRAM") for storing basic routines that help to startup the serve computer 702 and to transfer information between the various components and devices. The ROM 810 or NVRAM can also store other software components necessary for the operation of the server computer 702 in accordance with the configurations described herein.

The server computer 702 can operate in a networked environment using logical connections to remote computing devices and computer systems through a network, such as the network 708. The chipset 806 can include functionality for providing network connectivity through a NIC 812, such as a gigabit Ethernet adapter. The NIC 812 is capable of connecting the server computer 702 to other computing devices over the network 708. It should be appreciated that multiple NICs 812 can be present in the server computer 702, connecting the computer to other types of networks and remote computer systems.

The server computer 702 can be connected to a storage device 818 that provides non-volatile storage for the computer. The storage device 818 can store an operating system 820, programs 822, and data, which have been described in greater detail herein. The storage device 818 can be connected to the server computer 702 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 702 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the server computer 702 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 702 can further read information from the storage device 818 by detecting the physical states or characteristics of one or more particular locations within the physical storage units.

In addition to the mass storage device 818 described above, the server computer 702 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 702. In some examples, the operations performed by devices in a distributed application architecture, and or any components included therein, may be supported by one or more devices similar to server computer 702. Stated otherwise, some or all of the operations performed by the network architecture 100, 132, 136, or 200 or 300 and or any components included therein, may be performed by one or more server computer 702 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 702. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 702.

In one embodiment, the storage device 818 or other computer-readable storage media is encoded with computer-executable instructions which, when loaded into the computer 702, transform the computer from a general-purpose computing system into a special-purpose computer capable of implementing the embodiments described herein. These computer-executable instructions transform the computer 702 by specifying how the CPUs 804 transition between states, as described above. According to one embodiment, the computer 702 has access to computer-readable storage media storing computer-executable instructions which, when executed by the computer 702, perform the various processes described above with regard to FIGS. 1-6. The computer 702 can also include computer-readable storage media having instructions stored thereupon for performing any of the other computer-implemented operations described herein.

The server computer 702 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 902 might not include all of the components shown in FIG. 8, can include other components that are not explicitly shown in FIG. 8, or might utilize an architecture completely different than that shown in FIG. 8.

As described herein, the server computer 702 may comprise one or more of a router, load balancer and/or server. The server computer 702 may include one or more CPUs 804, configured to execute one or more stored instructions. The CPUs 804 may comprise one or more cores. Further, the computer 702 may include one or more network interfaces configured to provide communications between the server computer 702 and other devices, such as the communications described herein as being performed by the router, load balancer and/or server. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for providing a distributed application load-balancing architecture that is capable of supporting multipath transport protocol. That is, the server computer 702 may comprise any one of the routers, load balancers, and/or servers. The programs 822 may comprise any type of program that cause the server computer 702 to perform techniques for communicating with other devices using any type of protocol or standard usable for determining connectivity.

Figure 9:
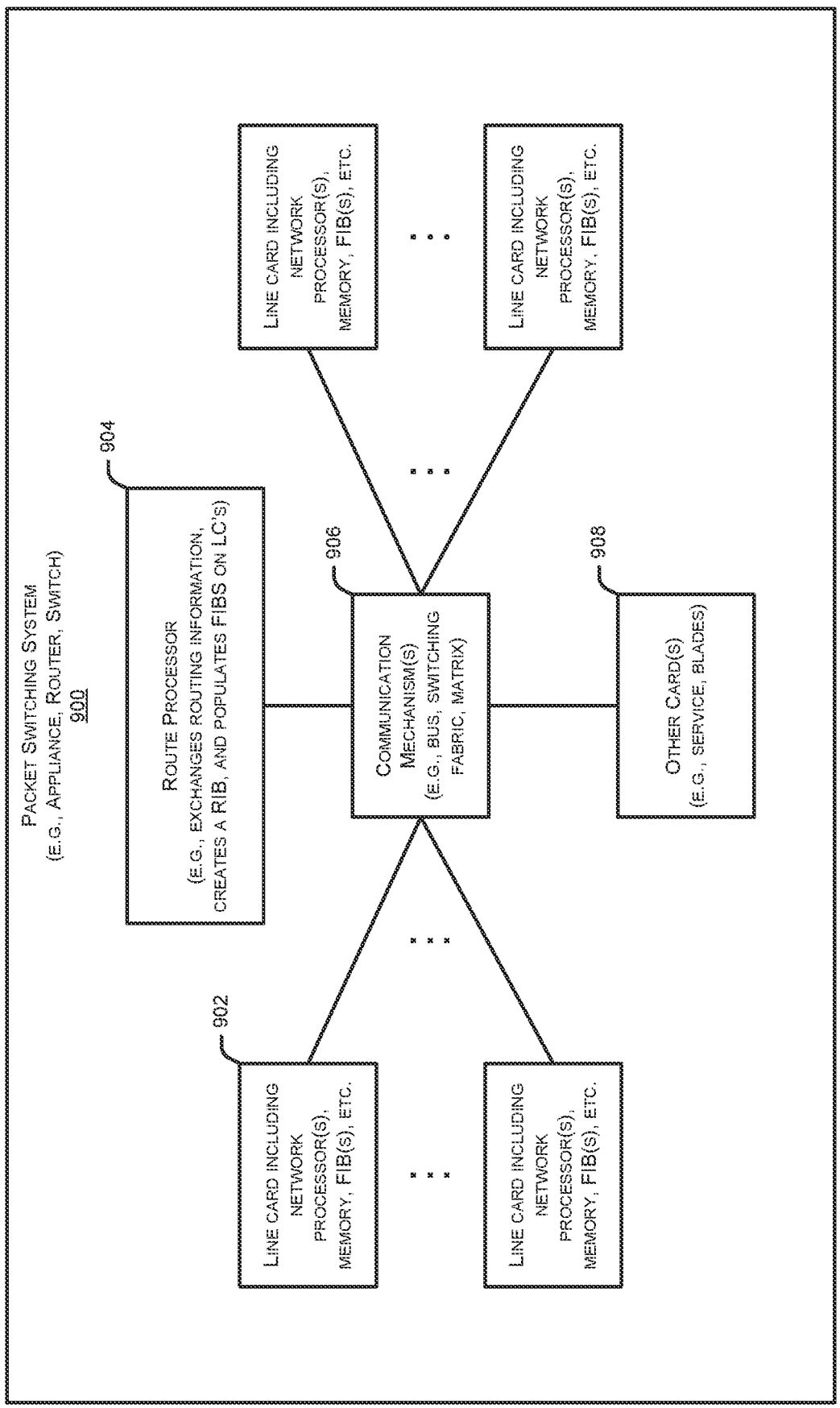
FIG. 9 illustrates a block diagram illustrating an example packet switching system that can be utilized to implement various aspects of the technologies disclosed herein.

FIG. 9 illustrates a block diagram illustrating an example packet switching device (or system) 900 that can be utilized to implement various aspects of the technologies disclosed herein. In some examples, packet switching device(s) 900 may be employed in various networks, such as, for example, WAN 110 as described with respect to FIGS. 1A-C. In some examples, the packet switching device(s) 900 may be employed in the border node 108, 210 or 310.

In some examples, a packet switching device 900 may comprise multiple line card(s) 902, each with one or more network interfaces for sending and receiving packets over communications links (e.g., possibly part of a link aggregation group). The packet switching device 900 may also have a control plane with one or more processing elements 905 for managing the control plane and/or control plane processing of packets associated with forwarding of packets in a network. The packet switching device 900 may also include other cards 908 (e.g., service cards, blades) which include processing elements that are used to process (e.g., forward/send, drop, manipulate, change, modify, receive, create, duplicate, apply a service) packets associated with forwarding of packets in a network. The packet switching device 900 may comprise hardware-based communication mechanism 906 (e.g., bus, switching fabric, and/or matrix, etc.) for allowing its different entities 902, 904, and 908 to communicate. Line card(s) 902, may typically perform the actions of being both an ingress and/or an egress line card 902, in regard to multiple other particular packets and/or packet streams being received by, or sent from, packet switching device 900.

Figure 10:
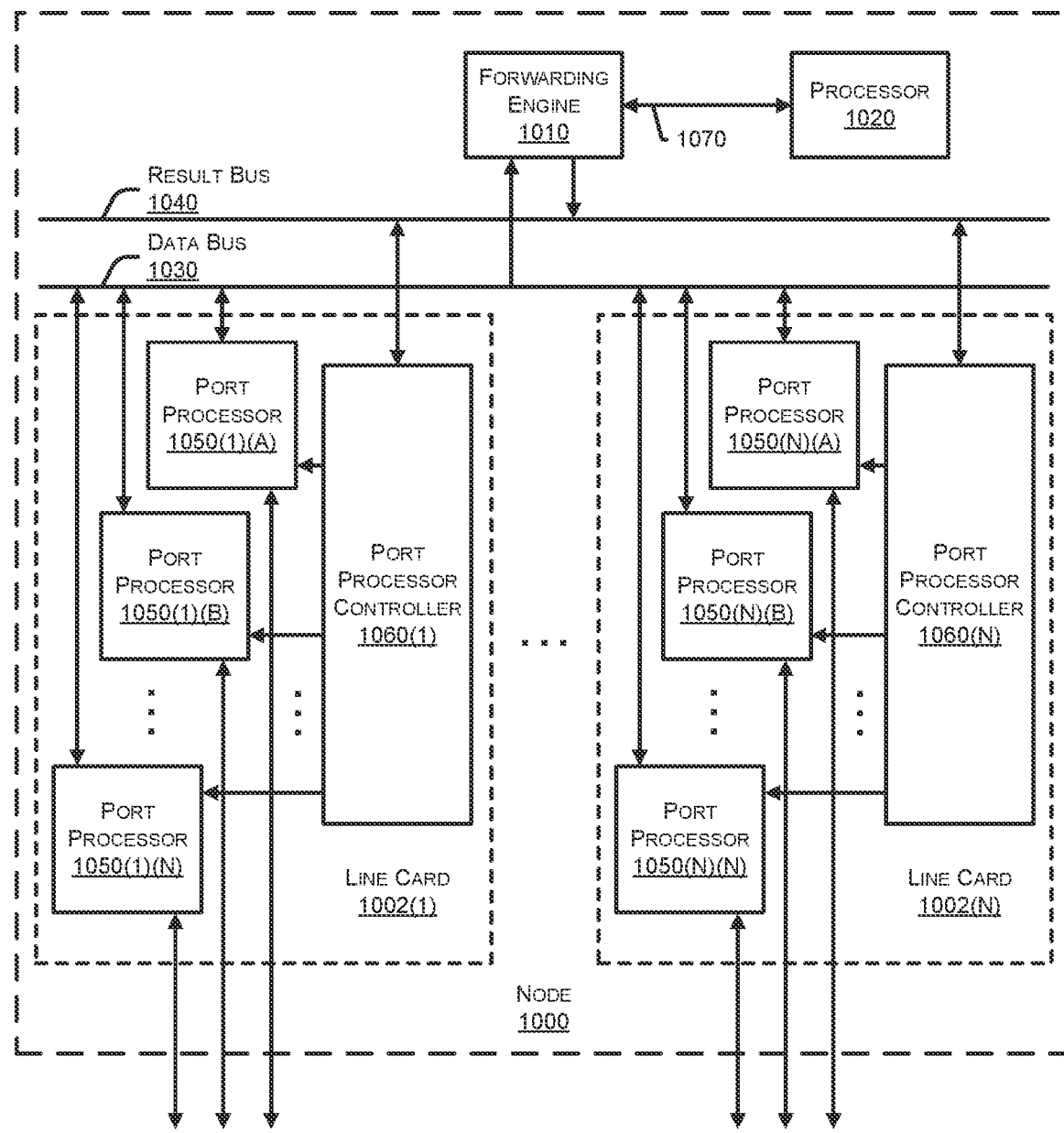
FIG. 10 illustrates a block diagram illustrating certain components of an example node that can be utilized to implement various aspects of the technologies disclosed herein.

FIG. 10 illustrates a block diagram illustrating certain components of an example node 1000 that can be utilized to implement various aspects of the technologies disclosed herein. In some examples, node(s) 1000 may be employed in various networks, such as, for example, WAN 110 as described with respect to FIGS. 1A-C. In some examples, the node 1000 employed in border node 108 of FIGS. 1A-C, or border node 210 of FIG. 2 or border node 310 of FIG. 3.

In some examples, node 1000 may include any number of line cards 1002 (e.g., line cards 1002(1)-(N), where N may be any integer greater than 1) that are communicatively coupled to a forwarding engine 1010 (also referred to as a packet forwarder) and/or a processor 1020 via a data bus 1030 and/or a result bus 1040. Line cards 1002(1)-(N) may include any number of port processors 1050(1)(A)-(N)(N) which are controlled by port processor controllers 1060(1)-(N), where N may be any integer greater than 1. Additionally, or alternatively, forwarding engine 1010 and/or processor 1020 are not only coupled to one another via the data bus 1030 and the result bus 1040, but may also communicatively coupled to one another by a communications link 1070.

The processors (e.g., the port processor(s) 1050 and/or the port processor controller(s) 1060) of each line card 1002 may be mounted on a single printed circuit board. When a packet or packet and header are received, the packet or packet and header may be identified and analyzed by node 1000 (also referred to herein as a router) in the following manner. Upon receipt, a packet (or some or all of its control information) or packet and header may be sent from one of port processor(s) 1050(1)(A)-(N)(N) at which the packet or packet and header was received and to one or more of those devices coupled to the data bus 1030 (e.g., others of the port processor(s) 1050(1)(A)-(N)(N), the forwarding engine 1010 and/or the processor 1020). Handling of the packet or packet and header may be determined, for example, by the forwarding engine 1010. For example, the forwarding engine 1010 may determine that the packet or packet and header should be forwarded to one or more of port processors 1050(1)(A)-(N)(N). This may be accomplished by indicating to corresponding one(s) of port processor controllers 1060(1)-(N) that the copy of the packet or packet and header held in the given one(s) of port processor(s) 1050 (1)(A)-(N)(N) should be forwarded to the appropriate one of port processor(s) 1050(1)(A)-(N)(N). Additionally, or alternatively, once a packet or packet and header has been identified for processing, the forwarding engine 1010, the processor 1020, and/or the like may be used to process the packet or packet and header in some manner and/or maty add packet security information in order to secure the packet. On a node 1000 sourcing such a packet or packet and header, this processing may include, for example, encryption of some or all of the packet's or packet and header's information, the addition of a digital signature, and/or some other information and/or processing capable of securing the packet or packet and header. On a node 1000 receiving such a processed packet or packet and header, the corresponding process may be performed to recover or validate the packet's or packet and header's information that has been secured.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for rerouting traffic to a cloud-hosted application, the method comprising:
for an application hosted on a first virtual private cloud (VPC) location:
identifying, by a border node, a second VPC location that can host the application; and
determining, by the border node, a pathway to the second VPC location;
monitoring, by the border node, data to detect an error in the first VPC location or in the application, wherein the data includes transmission control protocol (TCP) statistics for the application on a first VPC location;
determining, by the border node, a potential error associated with the first VPC location or the application based on:
detecting a change in a first TCP statistic; and
determining that a last updated time difference between the first TCP statistic and a second TCP statistic is less than a predetermined threshold;
verifying, by the border node, that the potential error is a valid error; and
in response to verifying the potential error, performing, by the border node, a fast reroute of the traffic to the second VPC location using the pathway.

2. The method as in claim 1, wherein determining the pathway to the second VPC location is performed prior to detecting the potential error.

3. The method as in claim 1, wherein verifying the potential error is the valid error comprises determining that a failure occurred within the pathway to the first VPC location.

4. The method as in claim 1, wherein monitoring the data further comprises collecting the TCP statistics, and wherein:
the change in the first TCP statistic comprises an update in a To-application statistic;
the first TCP statistic comprises the To-application statistic; and
the second TCP statistic comprises a From-application statistic.

5. The method as in claim 1, wherein monitoring the data to detect the error in the first VPC location or the application includes snooping internet control message protocol data, wherein the internet control message protocol data indicates the error is in a node of a second pathway to the application in the first VPC location.

6. The method as in claim 5, wherein the internet control message protocol data indicates that the error is in a node of a network path to the application in the first VPC location.

7. The method as in claim 1, wherein verifying that the potential error is the valid error comprises using one or more of a bidirectional forwarding detection packet or a seamless bidirectional forwarding detection packet.

8. An application repair path gateway system comprising:
one or more processors; and
one or more non-transitory computer-readable media storing computer-executable instructions that, when executed by the one or more processors, cause the one or more processors to perform operations comprising:
for an application hosted on a first virtual private cloud (VPC) location:
identifying a second VPC location that can host the application; and
determining a pathway to the second VPC location;
monitoring data to detect an error in the first VPC location, wherein the data includes transmission control protocol (TCP) statistics for the application on the first VPC location;
determining, based on detecting a change in the data, a potential error associated with the first VPC location;
verifying that the potential error is a valid error; and
in response to verifying the potential error, performing a fast reroute of traffic for the application to the second VPC location using the pathway.

9. The application repair path gateway system as in claim 8, wherein determining the pathway to the second VPC location is performed prior to detecting the potential error.

10. The application repair path gateway system as in claim 8, wherein verifying the potential error is the valid error comprises determining that a failure occurred within the pathway to the first VPC location.

11. The application repair path gateway system as in claim 8, wherein the change in the data comprises an update in a To-application statistic and determining the potential error in the first VPC location further comprises:
in response to detecting the update in the To-application statistic, checking a last updated time difference between the To-application statistic and a From-application statistic; and
in response to determining that the last updated time difference is less than a predetermined threshold, determining the potential error has occurred.

12. The application repair path gateway system as in claim 8, wherein monitoring the data to detect the error in the first VPC location includes snooping internet control message protocol data.

13. The application repair path gateway system as in claim 12, wherein the internet control message protocol data indicates the error is in a node of a second pathway to the application in the first VPC location.

14. The application repair path gateway system as in claim 8, wherein verifying that the potential error is the valid error comprises using one or more of a bidirectional forwarding detection packet or a seamless bidirectional forwarding detection packet.

15. One or more non-transitory computer-readable media storing computer-executable instructions that, when executed by one or more processors, cause the one or more processors to perform operations comprising:
for an application hosted on a first virtual private cloud (VPC) location:
identifying a second VPC location that can host the application; and
determining a pathway to the second VPC location;
monitoring, based on collecting transmission control protocol (TCP) statistics for the application hosted on the first VPC location, data including the TCP statistics to detect an error in the first VPC location;
detecting, based on a change in the data, a potential error associated with the first VPC location;
verifying that the potential error is a valid error; and
in response to verifying the potential error, performing a fast reroute of traffic for the application to the second VPC location using the pathway.

16. The one or more non-transitory computer-readable media as in claim 15, wherein determining the pathway to the second VPC location is performed prior to detecting the potential error.

17. The one or more non-transitory computer-readable media as in claim 15, wherein verifying the potential error is a valid error comprises determining that a failure occurred within the pathway to the first VPC location.

18. The one or more non-transitory computer-readable media as in claim 15, wherein the change in the data comprises an update in a To-application statistic, and wherein detecting the potential error in the first VPC location further comprises:
in response to detecting the update in the To-application statistic, checking a last updated time difference between the To-application statistic and a From-application statistic; and
in response to determining that the last updated time difference is less than a predetermined threshold, determining the potential error has occurred.

19. The one or more non-transitory computer-readable media as in claim 15, wherein monitoring the data to detect the error in the first VPC location includes snooping internet control message protocol data.

20. The one or more non-transitory computer-readable media as in claim 19, wherein the internet control message protocol data indicates the error is in a node of a second pathway to the application in the first VPC location.

\* \* \* \* \*